(12) United States Patent
Uusimäki

(10) Patent No.: US 7,006,077 B1
(45) Date of Patent: *Feb. 28, 2006

(54) ELECTRONIC DEVICE HAVING TOUCH SENSITIVE SLIDE

(75) Inventor: Matti Uusimäki, Sahalahti (FI)

(73) Assignee: Nokia Mobile Phones, Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/451,167

(22) Filed: Nov. 30, 1999

(51) Int. Cl.
 G09G 5/00 (2006.01)
(52) U.S. Cl. .................. 345/173; 345/158; 345/174; 178/18.01
(58) Field of Classification Search ............ 345/173, 345/174, 157, 156, 158, 169; 455/90; 178/18.03, 178/18.01; 341/22; 361/679, 681; 400/491.2, 400/491.3; 382/313
See application file for complete search history.

(56) References Cited

U.S. PATENT DOCUMENTS

| | | | | |
|---|---|---|---|---|
| 4,374,354 A | * | 2/1983 | Petrovic et al. ............ 320/108 |
| 4,654,546 A | | 3/1987 | Kirjavainen ............... 307/400 |
| 5,053,758 A | * | 10/1991 | Cornett et al. ............. 345/174 |
| 5,220,318 A | * | 6/1993 | Staley ........................ 340/825 |
| 5,434,566 A | * | 7/1995 | Iwasa et al. .................. 341/34 |
| 5,465,401 A | * | 11/1995 | Thompson ................... 455/89 |
| 5,584,054 A | * | 12/1996 | Tyneski et al. ............. 455/566 |
| 5,632,548 A | * | 5/1997 | Mayfarth .................... 362/103 |
| 5,715,524 A | * | 2/1998 | Jambhekar et al. .......... 455/90 |
| 5,729,604 A | | 3/1998 | Van Schyndel ............. 379/390 |
| 6,115,620 A | * | 9/2000 | Colonna et al. ............. 455/569 |
| 6,216,989 B1 | * | 4/2001 | Shioya et al. ............ 248/122.1 |
| 6,241,531 B1 | * | 6/2001 | Roath et al. .................. 439/66 |
| 6,389,302 B1 | * | 5/2002 | Vance ......................... 455/567 |
| 6,397,078 B1 | * | 5/2002 | Kim ............................ 455/556 |
| 6,469,910 B1 | * | 10/2002 | Lefort ......................... 361/814 |
| 6,532,147 B1 | * | 3/2003 | Christ, Jr. ................... 361/683 |
| 6,535,749 B1 | * | 3/2003 | Iwata et al. ................. 455/556 |

FOREIGN PATENT DOCUMENTS

| | | |
|---|---|---|
| DE | 4222940 | 1/1994 |
| EP | 0802659 | 10/1997 |

(Continued)

*Primary Examiner*—Alexander Eisen
*Assistant Examiner*—Abbas Abdulselam
(74) *Attorney, Agent, or Firm*—Ware, Fressola, Van Der Sluys & Adolphson, LLP

(57) ABSTRACT

A communications device such as a mobile phone has a main body communications circuit and a movable housing element such as a touch sensitive slide or a flip-type hinged structure. In one embodiment, the main body communications circuit responds to a touch sensitive slide signal, for providing a communications signal to a communications system. The communications device includes a main body or housing for containing the main body communications circuit of the communications device, as well as a speaker and display. The touch sensitive slide responds to a contact force by a user, for providing the touch sensitive slide signal containing information about a position of the contact force applied by the user on the touch sensitive slide. The touch sensitive slide is slidably or hingeably mounted on the main body, and may contain slide position sensing. In this embodiment, the touch sensitive signal contains information about the position of the touch sensitive slide in relation to the housing. The touch sensitive slide is adaptable for use as a mouse or a drawing table together with the display of the communications device, which enables for windows-based word and data processing and graphical applications, as well as internet applications.

29 Claims, 6 Drawing Sheets

MAINLY KEYS IN USE

FOREIGN PATENT DOCUMENTS

| | | |
|---|---|---|
| GB | 2291560 | 1/1996 |
| GB | 2297661 | 8/1996 |
| GB | 2297662 | 8/1996 |
| WO | 9731469 | 8/1997 |
| WO | 9837506 | 8/1998 |
| WO | 9943134 | 8/1999 |

* cited by examiner

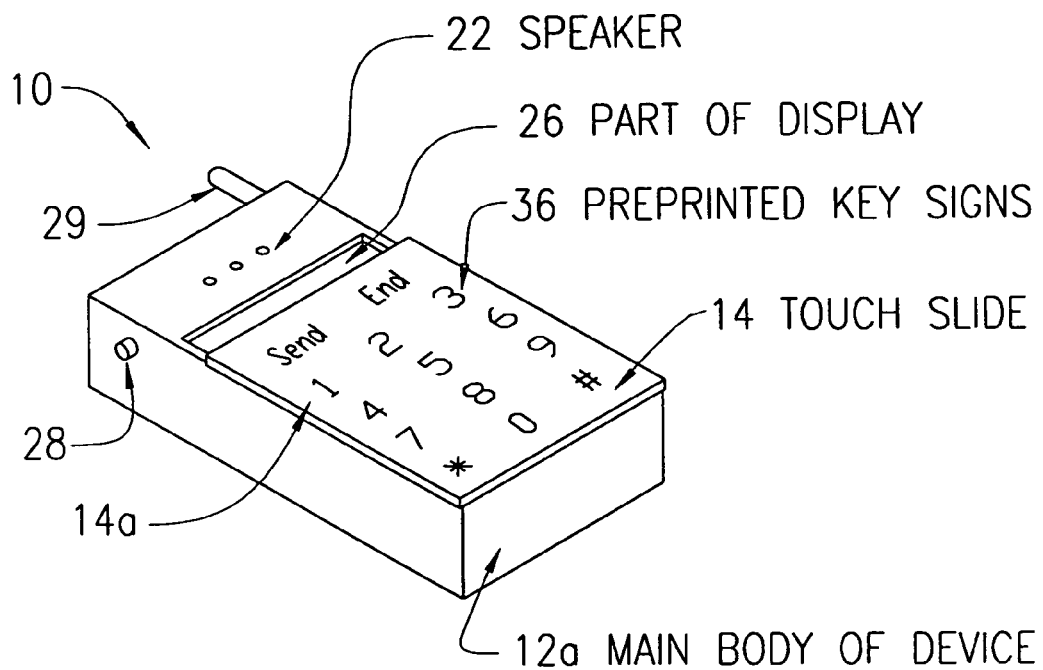
FIG. 1a MAINLY KEYS IN USE
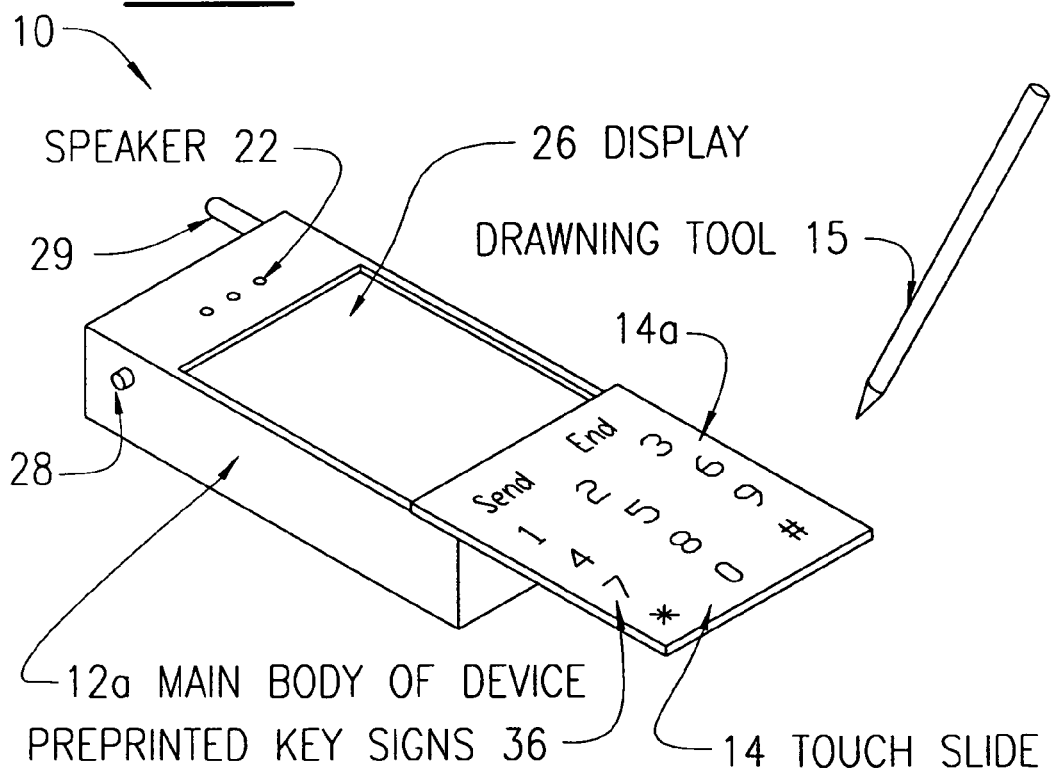
FIG. 1b KEYS, MOUSE OR DRAWING TABLE IN USE

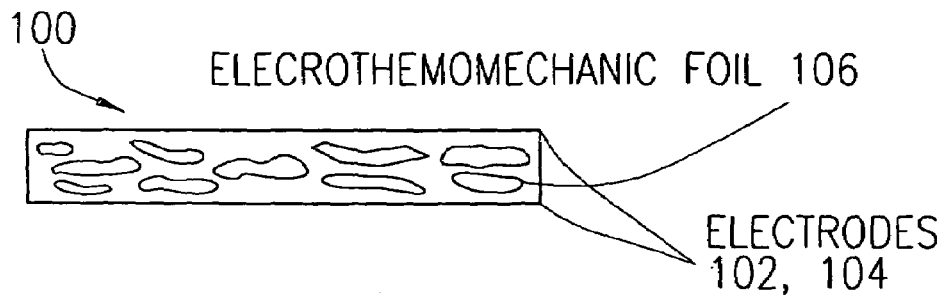
FIG. 3a (THE EMF TECHNOLOGY)
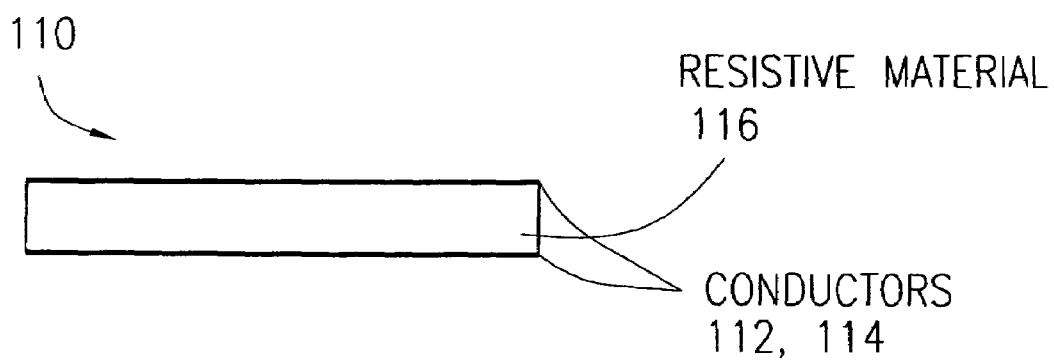
FIG. 3b (THE RESISTIVE TOUCH PANEL)
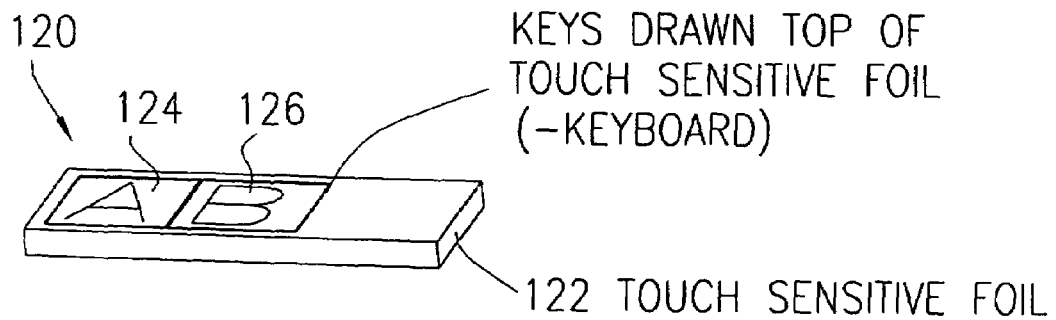
FIG. 4a (KEY CONSTRUCTION NO.1)

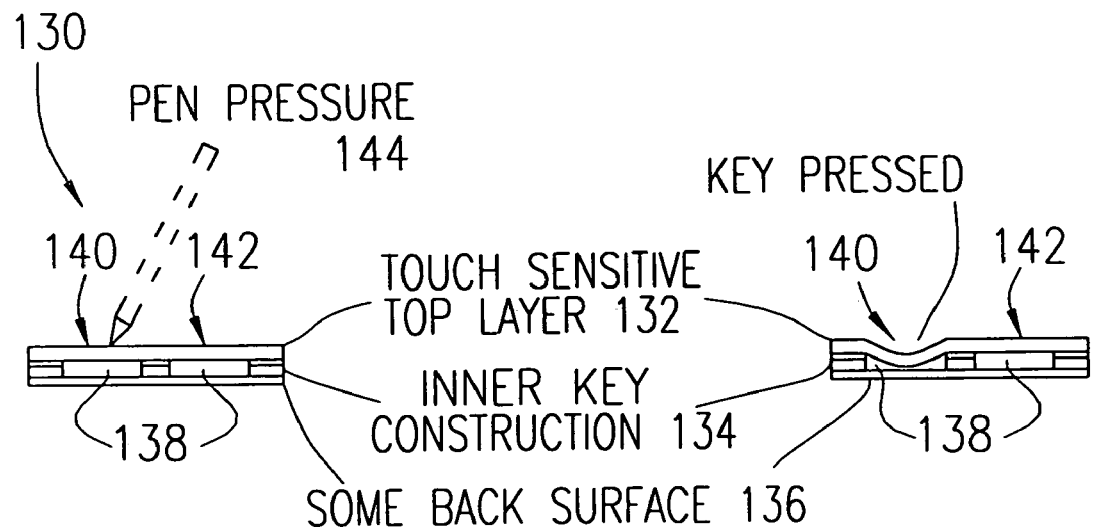
FIG. 4b (KEY CONSTRUCTION NO.2)
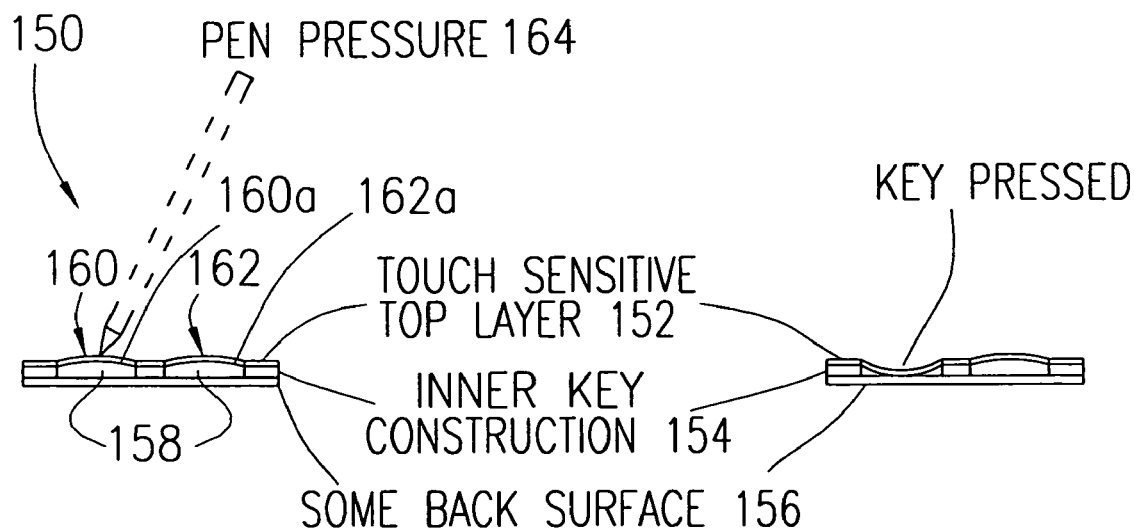
FIG. 4c (KEY CONSTRUCTION NO.3)

ELECTRONIC DEVICE HAVING TOUCH SENSITIVE SLIDE

BACKGROUND OF INVENTION

1. Technical Field

The present invention relates in general to the field of telecommunications/mobile phones, and more precisely to user interfaces, keyboards, mouse pads and messaging devices.

2. Description of Related Art

Many devices known in the art have a keyboard for writing text, but creating a picture with a keyboard is not easy. With a desktop computer, one approach has been to use a mouse. With smaller electronic devices, the approach has been to use touch screen technology. If the thickness of the screen has to be minimized, the usual approach has been to use a touch screen or an external mouse/trackball or a smaller touch sensitive drawing area. However, there are disadvantages to these approaches, because a touch screen can actually make the device thicker; an external mouse/trackball is an accessory which has to be carried with the device; and with the smaller touch sensitive areas, the resolution of the drawing capability is poor and the integration level of the approach is poor.

Moreover, in communicator type electronic devices, it has been a problem to make a device which is small enough for when it is not used, and large enough for when it is used. There are devices in the art with slides which cover the keyboard, but in that solution the size of the display is reduced. In addition, the usual approach has been to make a thick and expensive keyboard able to slide (or keep the slide as a pure slide). For example, the prior art device includes a display, a touch screen and a slide body having a keypad and keypad cover. The thickness of the mechanical keyframe, keyboard rubber and printed circuit board (PCB) for contact pads is easily about 2–3 millimeters in thickness. In effect, the overall mechanical structure of the keyboard makes it thick. There is a need for a small electronic device having mouse-type capability in the industry. Also, there is a need for sensing the phone location while in use to minimize the effects of loud ringing in the known devices.

In summary, the prior-art communications device increases the thickness and cost of the overall communications device and does not have the extra features discussed in more detail below in the communications device of the present invention.

SUMMARY OF INVENTION

The present invention provides a new and unique electronic device featuring a main body for housing a main housing communications circuit in combination with a movable housing element. The electronic device may be a communications device such as a mobile phone for communicating with a cellular communications system, as well as a Personal Digital Assistant (PDA), a notebook computer or other electronic devices. The main body may also house a speaker and a display.

In one embodiment, the movable housing element is a touch sensitive slide, and the main housing communications circuit responds to a touch sensitive slide signal, for providing a communications signal to a communications system.

The touch sensitive slide responds to a contact force by a user, for providing the touch sensitive slide signal containing information about the position of the contact force applied by the user on the touch sensitive slide. The information is used by the main housing communications circuit to control the communications device in relation to the user and the communications system.

The touch sensitive slide is slidably mounted on the housing, and has preprinted key signs, including either a send key, an end key, a pound key, an asterisk key or number keys from zero to nine, which the user presses to provide user input signals that are a part of the touch sensitive slide signal. The touch sensitive slide is made of touch sensitive resistive or capacitive material, and has one or two parameter sensing in the X or Y direction. The touch sensitive slide is also adaptable for using as a mouse or a drawing table for use together with the display of the communications device. This would enable the communications device to be used for windows-based word and data processing and graphical applications, as well as internet applications. In such a case, the touch sensitive slide is slid to an open position to expose the display in full. The touch sensitive slide signal would also contain information about a mouse or drawing table inputs. The touch sensitive slide also may be integrated with slide position sensing. In this case, the touch sensitive slide signal would also contain information about the position of the touch sensitive slide in relation to the housing.

In another embodiment, the movable housing element may also include a flip-type hinged structure that is hingeably mounted on the housing. The use of an EMF-based foil structure can provide keyboard and drawing operations on both sides of the touch sensitive slide.

In effect, the present invention provides a combined keyboard and drawing table that consists of a touch sensitive top layer. The top layer includes a resistive or capacitive touch sensing system. The keyboard keys could be drawn on the keyboard surface and in keyboard mode the device uses the key matrix, while in the drawing mode the drawing table is used and touch sensitive material is monitored in an analog manner with high resolution.

In the communications device of the present invention, drawing capability is integrated into the keyboard which in this solution is even thinner than the standard rubber keymat solution.

One advantage of the communications device is that it provides a large drawing area with high resolution which is always with the device, and it will not increase the height of the keyboard or device. (It could make it even thinner).

One advantage of the communications device of the present invention is that, by using the touch sensitive slide, there is no need for a separate keyboard and touch screen equipment. For example, there is no need for a separate touch screen because the touch sensitive slide can be used as a mouse or drawing table. Also, the cost of the keyboard is reduced since there is no need for a separate keyboard. In effect, the cost of the touch screen is translated into the cost of the touch sensitive slide.

Moreover, by using the touch sensitive slide, the overall device can be made thinner. The thickness of the touch material layer is about $1/100$ to $1/10$ of a millimeter. The use of the touch sensitive slide eliminates the need for the use of a separate keyboard having a thick mechanical structure. The touch sensitive system could be made with a tenth of a millimeter which is significantly less than the standard keyboard.

Also, some measurements of small weights are needed frequently (especially in applications where it is necessary to compare which of the two devices is heaviest).

BRIEF DESCRIPTION OF THE DRAWING

FIG. 1a is a diagram of an electronic device in a closed position that is the subject matter of the present patent application.

FIG. 1b is a diagram of the electronic device shown in FIG. 1a in an open position.

FIG. 3a is a cross section of one touch sensitive construction using EMF technology for the electronic device shown in FIGS. 1a, 1b.

FIG. 3b is a cross section of another touch sensitive construction using a resistive touch panel technology for the electronic device shown in FIGS. 1a, 1b.

FIG. 4a is a cross section of one embodiment of a keyboard construction for the electronic device shown in FIGS. 1a, 1b.

FIG. 4b is a cross section of another embodiment of a keyboard construction for the electronic device shown in FIGS. 1a, 1b.

FIG. 4c is a cross section of still another embodiment of a keyboard construction for the electronic device shown in FIGS. 1a, 1b.

DETAILED DESCRIPTION OF THE INVENTION

Figure 2:
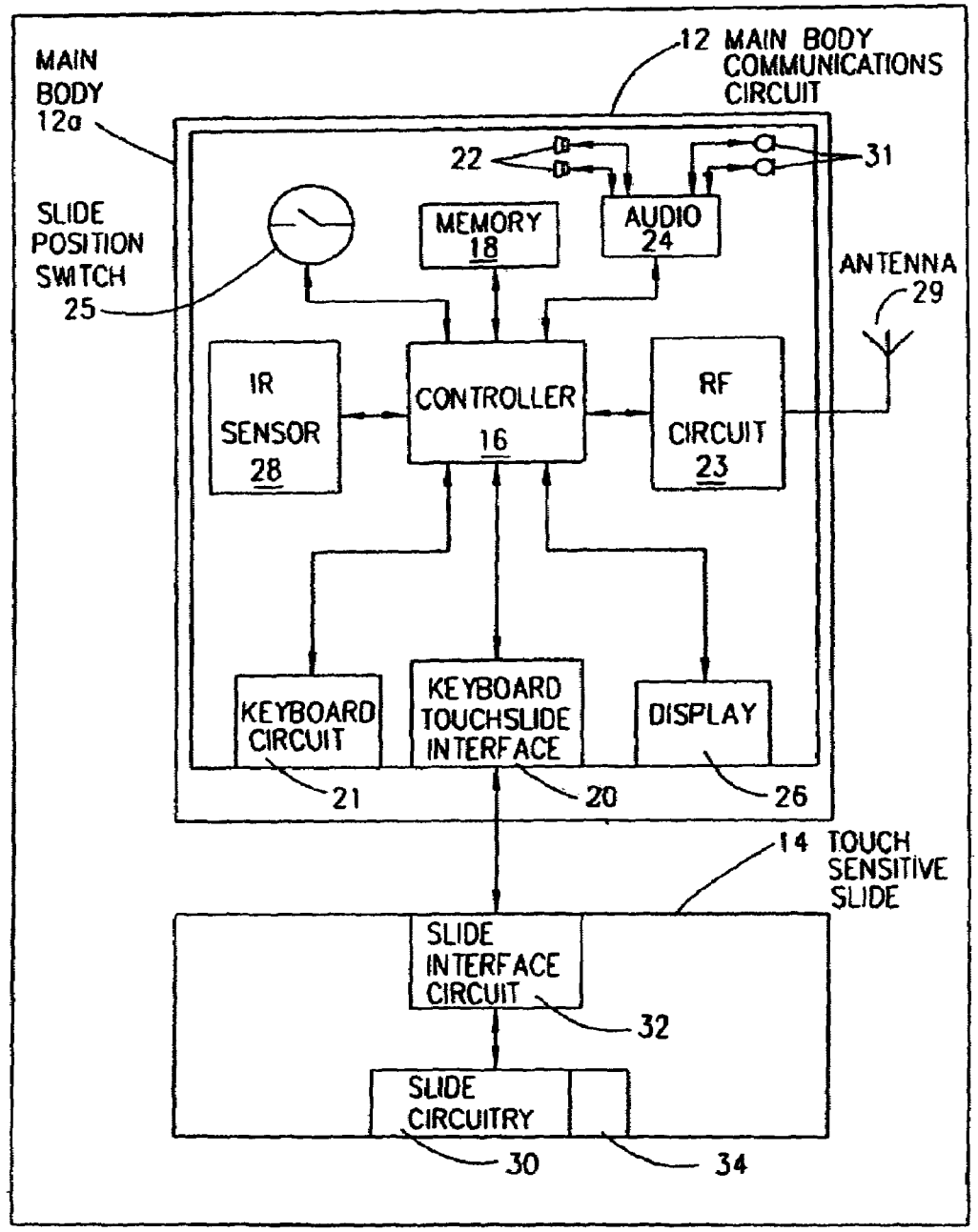
FIG. 2 is a block circuit diagram of the electronic device shown in FIGS. 1a, 1b.

FIGS. 1a, 1b FIGS. 1a, 1b show an electronic device, including a communications device such as a mobile phone generally indicated as 10. The mobile phone 10 communicates with a cellular communications system (not shown), although the scope of the invention is not intended to be limited to any particular application for the communications device. Embodiments are envisioned in which the electronics device 10 is a Personal Digital Assistant (PDA) (not shown), a notebook computer (not shown) or other electronic devices (not shown).

In FIGS. 1a, 1b, the mobile phone 10 includes a movable housing element such as a touch sensitive slide 14 that has a surface 14a having preprinted key signs 36, including a send key, an end key, a pound key, an asterisk key or number keys from zero to nine, which are pressed by the user to provide touch sensitive slide signals in the form of user inputs with communications information discussed below. As shown, the preprinted key signs 36 are drawn or printed on the surface 14a of the touch sensitive slide 14, but the scope of the invention is not intended to be limited to the manner of applying the preprinted key signs 36 on the surface of the touch sensitive slide 14, as discussed below.

The Closed Slide Position in FIG. 1a

In FIG. 1a, the touch sensitive slide 14 is in a closed position for use mainly with preprinted key signs 36. In FIG. 1a, only part of the display 26 can be seen when the touch sensitive slide 14 is in the closed position. The touch sensitive slide 14 will cover most of the display 26 for reducing damage to the display 26, which is a more expensive part to change or replace than the touch sensitive slide 14. The part of the display 26 exposed will show, for example, a phone number dialed by the user, as well as other communications information.

The Open Slide Position in FIG. 1b

In FIG. 1b, the touch sensitive slide 14 is in an open position for use with preprinted key signs 36, as well as for use as a mouse pad and a drawing table as discussed below. As shown, when the touch sensitive slide 14 is in the open position, the surface 14a, also known as a slide area, of the touch sensitive slide 14 can be used as a mouse pad or as a drawing table, and can be used together with a full display 26 as a screen. In this case, the touch sensitive slide signal would also include information about mouse pad or drawing table inputs. As shown, the communications device 10 includes a drawing tool 15 for such an application. In the drawing operation mode, the preprinted key signs 36 are ignored so the touch sensitive slide 14 can be used for the mouse or drawing operation.

Slide Position Sensing

A slide position switch 25 discussed in relation to FIG. 2 will sense the position of the touch sensitive slide 14 in relation to the main body 12a. The slide position sensing discussed below may be used to coordinate and determine the partial or full display of information on the display 26 depending on the position of the touch sensitive slide 14 in relation to the main body or housing 12a. Different kinds of slide position sensing methods are known in the art and may be used, including but not limited to: mechanical, electric, magnet/reed-raly, magnet/hall sensor, etc. The scope of the invention is not intended to be limited to any particular kind of slide position sensing.

FIG. 2: The Basic Circuit Diagram

FIG. 2 shows a block diagram of circuits in the main body 12a and the touch sensitive slide 14. Similar elements in FIGS. 1a, 1b and 2 are labelled with similar reference numerals.

The Main Body Communications Circuit 12

FIG. 2 shows a block diagram of a main body communications circuit 12 for the mobile phone 10 shown in FIGS. 1a, 1b for use in combination with the touch sensitive slide 14. The main body or housing 12a best shown in FIGS. 1a, 1b contains the main body communications circuit 12.

The main body communications circuit 12 includes a controller 16, a memory 18, a keyboard touchslide interface 20, a keyboard circuit 21, an RF circuit 23, an audio circuit 24, a slide position switch 25, a display 26, an infrared sensor 28, an antenna 29 and a microphone 31, which are known circuits or elements in the art.

In operation, the main body communications circuit 12 responds to a touch sensitive slide signal from the touch sensitive slide 14, for providing a communications signal to a communications system (not shown). The main body communications circuit 12 provides the communications signal to the communications system (not shown) via the antenna 29.

In FIG. 2, the speaker 22, the microphone 31, and the display 26 are all shown as a part of the main body communications circuit 12. However, the main body or housing 12a may also be considered, for example, as containing the speaker 22, the microphone 31 and the display 26. The scope of the invention is intended to include either having the speaker 22, the display 26 and the microphone 31 as a part of the main body communications circuit 12 as generally indicated, or having these elements as a separate part of the main body 12a, or some combination thereof. Embodiments are also envisioned in which the speakers or microphone could be placed in the slide as well. If the speaker 22, the display 26 and the microphone 31 are a part of the main body 12a, then the main body communications circuit 12 may also respond a microphone signal from the user via the audio circuit 24 and the microphone 31, and the provision of the communication signal may include providing a voice component signal to the user via the audio circuit 24 and the speaker 22, as well as providing a display component signal to the user via the display 26. The scope of the invention is not intended to be limited to which of any one or more of these elements are a part of the main body 12a or the main body communications circuit 12.

As shown, the keyboard circuit 21 is included in the main body communications circuit 12. However, embodiments are envisioned in which the necessary keys are implemented on the touch slide 14 and operable when the touch slide 14 is in a closed position as discussed above in relation to FIG. 1a.

In FIG. 2, the controller 16 coordinates all communications functions for the communications device 10, including the exchange of communications information between the user and the communications system (not shown), the exchange of data and control signals between the memory 18, the keyboard touchslide interface 20, the keyboard circuit 21, the RF circuit 23, the audio circuit 24, the slide position switch 25, the display 26, the infrared sensor 28, the antenna 29 and the microphone 31, and also the exchange of communications information between the main body communications circuit 12 and the touch sensitive slide 14. The controller 16 is implemented with software using a microprocessor architecture, which is known in the art, and typically includes the memory 18, one or more input/output devices and control, data, and address buses. The controller 16 contains communications circuitry that is known in the art, and the scope of the invention is not intended to be limited to any particular type of communications circuitry, or whether the controller functions are performed using hardware, software or a combination thereof. By way of example only, the reader is referred to United Kingdom Patent Application No. GB 2 297 662, hereby incorporated by reference in its entirety, for such communications circuitry.

The controller 16 receives the touch sensitive slide signal from the touch sensitive slide 14 via the keyboard touchslide interface 20, and receives one or more input signals from the slide position switch 25 and the infrared sensor 28, for implementing appropriate communications functions by processing user inputs from the touch sensitive slide 14, as described in further detail below.

A person skilled in the art would appreciate how the controller 16 cooperates with the other elements shown in FIG. 2. By way of example only, the functions of these other elements are briefly described below. The controller 16 provides audio output signals to the audio circuit 24, for providing voice signals to the speaker 22. The controller 16 receives audio input signals from the microphone 31 via the audio circuit 24 for receiving voice signals from the user. The controller 16 provides display information signals to the display 26 for displaying communications information to the user. The infrared sensing device 28 senses the placement or location of the communications device 10, as well as the main body or housing 12a as best shown in FIGS. 1a, 1b, and provides an infrared sensor signal to the controller 16, all discussed in more detail below. The controller 16 provides a ring control signal to the audio circuit 24 for adjusting the volume of the speaker 22 in relation to an input from the infrared sensor 28 discussed below. The slide position switch 25 responds to the position of the touch sensitive slide 14 in relation to the main body 12a, for providing a slide position switch signal to the controller 16 containing information about the position of the touch sensitive slide 14 in relation to the main body or housing 12a.

The Touch Sensitive Slide 14

The touch sensitive slide 14 includes a touch sensitive slide circuitry 30 and a slide interface circuit 32. In operation, the touch sensitive slide 14 responds to a contact force by a user (not shown), for providing the touch sensitive slide signal containing information about a position of the contact force applied by the user on the touch sensitive slide 14. The information includes communications information about user keyboard inputs and mouse and drawing table inputs that are discussed above in relation to FIGS. 1a, 1b.

The touch sensitive slide 14 is known in the art, and may include touch sensitive resistive or capacitive material, and may have one or two parameter sensing in the X or Y direction. Electro-Mechanical Film (also known as "EMF-material") may be used which is very robust and withstands very hard handling (capacitive-type sensing system), and which is shown and described in U.S. Pat. No. 4,654,546, hereby incorporated by reference in its entirety. The scope of the invention is not intended to be limited to such Electro-Mechanical Film, because embodiments are envisioned and described below using other types of thin touch sensitive resistive or capacitive material known in the art, including but not limited to a resistive touch panel. By way of example, FIGS. 3a, 3b, discussed below, show two different technologies that can be used for the touch sensitive slide 14.

In FIG. 2, the touch sensitive slide circuitry 30, responds to the position of the contact force applied by the user, for providing the touch sensitive slide signal containing information about the position of the contact force applied by the user to the touch sensitive slide interface 32. The touch sensitive slide interface 32 cooperates with the keyboard touchslide interface 20, as discussed above, for providing the touch sensitive signal to the controller 16.

The touch sensitive slide 14 is slidably mounted on the main body or housing 12a as shown and discussed in relation to FIGS. 1a, 1b. In this embodiment, the touch sensitive slide interface 32 would include a slidably mounted interface for providing the touch sensitive slide 14 to the keyboard touchslide interface 20 of the main body communications circuit 12. In effect, the standard keyboard on the touch sensitive slide 14 would have drivers and other lines on the interface between the touch sensitive slide 14 and the main body or housing 12a. The drivers provide the touch sensitive slide signal to the keyboard touchslide interface 20 of the main body communications circuit 12. Such a touch sensitive slide interface 32 is known in the art, and can be based on one or two parameter sensing (x and y directions). In particular, one kind of interface known in the art would need only three wires. The mouse-type operation and the drawing table operation are easily adapted therein because the cursor movement is based mainly on the change of the resistance or capacitance, and in such a way the different positions of the slide could be compensated. The scope of the invention is not intended to be limited to any particular slide interface circuit or system.

As shown, the touch sensitive slide circuitry 30 may include a touch sensitive slide color changing circuit 34 (FIG. 2) that will change the color of the surface of the touch sensitive slide 14, depending on the contact force applied by the user. A touch sensitive slide circuitry 30 having such a touch sensitive slide color changing circuit 34 is known in the art, and the scope of the invention is intended to be limited to any particular type thereof.

The touch sensitive slide circuitry 30 may also have means for changing the color of the surface thereof depending on the contact force applied by the user. In operation, materials are used to cover the touch sensitive slide 14 (or under it) which changes the color because of the pressure. With this kind of approach the overall usability of the touch sensitive slide 14 could be increased.

The "Clicking" Keystroke Confirmation Sound

With the touch sensitive system of the present invention, each preprinted sign key 36 that is pressed could be sensed, and the keying could be confirmed by a 'click' sound. In operation, the controller 16 would provide a key stroke confirmation signal to the audio circuit 24 to confirm a key stroke from a user, which in turn provides a confirmation signal to the speaker 22 to generate a "click" sound when a respective preprinted key sign 36 (FIGS. 1a, 1b) is pressed on the touch sensitive slide 14.

Infrared Placement and Location Detector

In FIGS. 1a, 1b, and 2, the infrared sensor device 28 will detect the placement or location of the communications device 10 in relation to another object, such as a head of a user, as well as an object resting on the touch sensitive slide 14. Infrared sensing may be used to determine if the communications device 10 is near the user's head or not. When the communications device 10 is near the user's head, it is preferable to have a normal ring level. In comparison, when the communications device 10 is not near the user's head, it is preferable to have a higher than normal ring level. (If the communications device 10 is in the bag, the sound (ringing tones) should be as loud as possible.) Separation of these two situations just based on one point of sensing is critical. By using the touch sensitive slide 14, the difference between the user's head and bag could be determined and separated. When the communications device 10 is in the bag, it is very probable that there is something covering the infrared sensor 28 near the headset speaker, and at the same time there is something touching or gently pressing the touch-sensitive slide 14. When the communications device 10 is used near the user's head, the infrared sensor 28 could sense the user's head, but because of the shape of the user's head, nothing is pressing the touch sensitive slide 14, if the slide is open or closed. The present invention also makes the user's head sensing more reliable. This information not only can be used to adjust ringing tones, but may be used for other possible solutions in relation to determining the location of the phone.

Such infrared sensor devices are known in the art, and the scope of the invention is not intended to be limited to any particular kind thereof. By way of example, one such infrared sensor device is shown and described in U.S. Pat. No. 5,729,604, hereby incorporated by reference.

In operation, the infrared sensor device 28 has an infrared sensor and an infrared sensor circuit for detecting the placement or location of the communications device 10 in relation to the object. The infrared sensor circuit 28 would respond to an infrared sensor signal, for providing an infrared sensor circuit signal to the controller 16 containing information about the placement or location of the communications device 10 in relation to the object. The controller 16 would respond to the infrared sensor circuit signal and further responds to information contained in the touch sensitive slide signal, for adjusting the ringing of the audio circuit. As discussed above, the infrared sensor signal contains information about the location of the sensor in relation to a user's ear, while the touch sensitive slide signal contains information about any contact on the touch sensitive slide that might indicate whether the communications device is resting against the object.

Touch Slide Guide Sounds

In FIGS. 1a, 1b and 2, the speaker 22 provides a keying guide sound having information about the preprinted key signs 36 which is activated by applying less pressure on the touch sensitive slide 14 for assisting people having a sight handicap. For blind people, the guide sound could inform the user of the key they are going to push.

FIGS. 3a, 3b: The Touch Sensitive Slide Technology

FIGS. 3a and 3b are cross sections of two possible touch sensitive construction, resistive and EMF for the touch sensitive slide 14 in FIGS. 1a, 1b and 2.

FIG. 3a shows EMF technology generally indicated as 100, which is known in the art and consists of opposing electrodes 102, 104 and an electro mechanical foil 106 sandwiched inbetween.

FIG. 3b shows a resistive touch panel technology generally indicated as 110, which is known in the art and consists of opposing conductors 112, 114 and a resistive material 116 sandwiched inbetween.

A person skilled in the art would appreciate how to implement these embodiments in FIGS. 3a, 3b, which may include the use of a two-channel AD converter (not shown) and voltage source (not shown).

FIGS. 4a, 4b, 4c: The Inner Construction For the Touch Sensitive Slide Technology FIGS. 4a, 4b, 4c are cross sections of three different possibilities for a keyboard construction of the touch sensitive slide 14 in FIGS. 1a, 1b and 2.

FIG. 4a shows a keyboard construction generally indicated as 120 having a touch sensitive foil 122 with keys 124, 126 drawn on top thereof. In the alternative, if the keyboard is transparent, then the keys could be drawn on the touch sensitive foil. As shown, there is no internal construction when compared to the embodiments in FIGS. 4b, 4c discussed below, and this solution is the thinnest one of the three embodiments shown in FIGS. 4a, 4b, 4c. For drawing, this embodiment provides a very good solution since the surface is flat. However, since the keys 124, 126 are just visual symbols (not raised or lowered), it may not be easy for a user to locate the keys, so the key-pad operation may be more difficult for some when compared to the embodiments in FIGS. 4b, 4c discussed below. The comfortability may not be as good during typing when compared to the embodiments in FIGS. 4*b*, 4*c* discussed below.

FIG. 4*b* shows a keyboard construction generally indicated as 130 having a touch sensitive top layer 132, an inner key construction 134 and a back surface 136. In FIG. 4*b*, there is a simple inner key construction. The keyboard construction 130 has holes 138 underneath keys 140, 142 on the touch sensitive top layer 132. During writing, the keys 140, 142 could be clicked so there is a feel of movement. As shown, the keyboard construction 130 can be used with a pressure pen 144. This solution is also good for using the surface for drawing. Note that in this solution the surface of keys 140, 142 could be lower than the surface of the keyboard a little so the placement of keys 140, 142 could be felt from hollows, although this modification is not the best for using the surface for drawing.

FIG. 4*c* shows a keyboard construction generally indicated as 150 having a touch sensitive top layer 152, an inner key construction 154 and a back surface 156. This provides a very well-round solution for the following reasons: The touch sensitive top layer 152 has keys 160, 162. There are hills 160*a*, 162*a* for indicating the place of keys 160, 162. This is best for typing, and if the shapes are smooth enough the drawing is quite easy. The keys 160, 162 are design to provide a good feeling to their placement and to the movement when pressed.

Note that the keys 160, 162 could be constructed on top of the keyboard plastic surface or on the top of a printed circuit board (PCB). If made on top of a PCB, the conventional key indication (shortcutting) is possible with the embodiments in FIGS. 4*b* and 4*c*. If the placement is on top of the keyboard plastic surface, the user pressure could be sensed (at least with resistive foil) to indicate the difference with drawing or key pressing.

General Description of the Inner Keyboard Constructions

In FIGS. 4*a*, 4*b*, 4*c*, the combined keyboard and drawing table consists of a touch sensitive top layer. The top layer consists of a resistive or capacitive touch sensing system, (like EMF, Electro mechanic foil, or Force sensing resistor, from international electronic engineering, or some solution which is used in an existing touch screen). In the simplest solution shown in FIG. 4*a*, no internal construction is needed. The keyboard keys are drawn on these materials, while in the keyboard mode the communications device 10 uses the key matrix; and in the drawing mode the drawing table is used, and the touch sensitive material is monitored using analog technology with high resolution.

The other solutions in FIGS. 4*b*, 4*c* add some construction under the touch sensitive top layer where the keyboard matrix could be configured and a small movement to the keys could be made. With this solution the feeling of a push could be arranged more easily than with the first solution in FIG. 4*a*. The movement of the keys cannot be too large, because most of the touch sensitive foils cannot withstand very large movements (but, for example, EMF should withstand the movement better than others).

In all these solutions in FIGS. 4*a*, 4*b*, 4*c*, the top of the keyboard is flat. The flat solution is best for drawing, but the typing is not so comfortable. On the other hand, the keys could be constructed with an under layer construction by creating hills or hollows on the top surface, but in this solution the drawing is not so easy. If the shape of the keys are smooth, the drawing is possible, and certainly easier than trying to create the figures by typing.

Note that these solutions also enable icon-based displays, because with this solution the user could use their finger like a mouse. Also, the drawing is easy because the keyboard size is almost the same as the size of the display, and in that way locating of a drawing point is easy. Also, the usability (i.e. the mouse operation or drawing operation) is just a design issue. For example, in the drawing mode locating of a placement could be done with a finger and the cursor on the screen. When the starting point has been determined, one key is pressed down and then the user could draw a visible line to the screen.

If the top layer and internal construction are transparent, the keys could be drawn on the back surface. If the top layer is non-transparent, the mark of the keys should be drawn on the top of the top layer. The permanent key marks could be used because the standard keyboard is used in the typing mode; and in the drawing mode no marks are needed (corner signs could also be used).

Minimizing the thickness of the device is one important goal of the present invention. With the solutions described herein, the thickness of the display is not increased, and by replacing the standard rubber keymat with this solution, the height of the keyboard could be decreased.

With this option the possibility of drawing could be included to a device like Nokia 9000 Communicator, and the height of the device will be decreased.

Figure 5A:
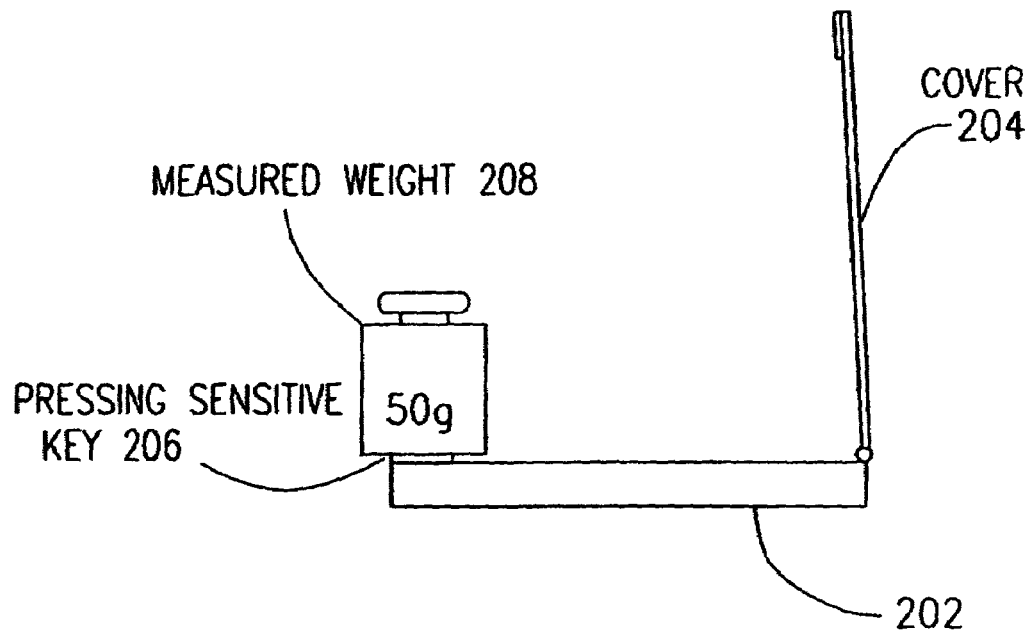
FIG. 5a shows an embodiment of an electronic device that is the subject matter of the present invention with the cover open.
Figure 5B:
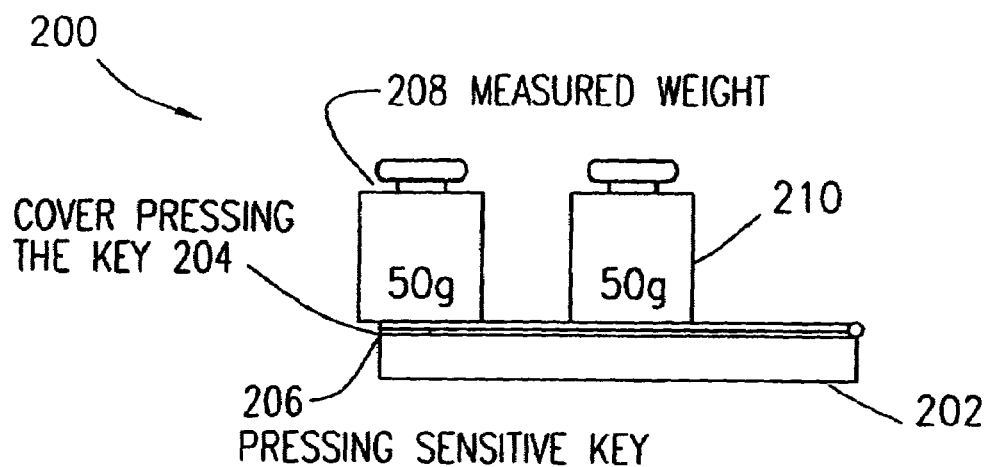
FIG. 5b shows the embodiment of an electronic device shown in FIG. 5a with the cover closed.
Figure 5C:
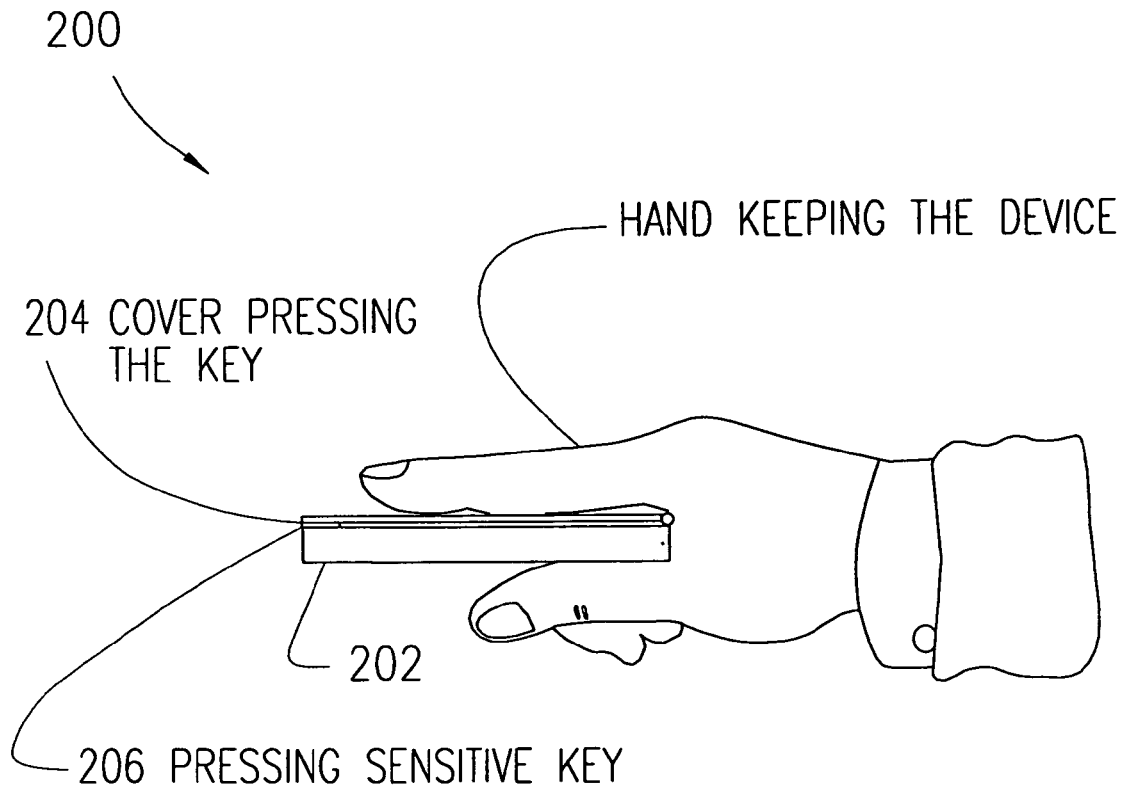
FIG. 5c shows the embodiment of an electronic device shown in FIG. 5a with the cover closed and a hand griping the same.

FIGS. 5*a*, 5*b*, 5*c*

In the present invention, the movable housing element may be a flip-type hinged structure that is hingeably mounted on the main body and also be used for other features such as a weight and hand sensing system.

For example, FIGS. 5*a*, 5*b*, 5*c* show an electronic device generally indicated as 200 such as a laptop computer or notebook. As shown in FIGS. 5*a*, 5*b*, 5*c* the device 200 has a main body 202 and a cover 204 that is hingeably connected to the main body 202. As shown, the main body 202 has one or more pressure sensitive keys generally indicated as 206. Although not shown, the scope of the invention is intended to cover embodiments in which the cover 204 has one or more pressure sensitive keys.

In operation, in FIG. 5*a* the weight 208 can be placed on the one or more pressure sensitive keys 206 for providing a measurement. In FIG. 5*b*, the weight 208 or 210 can be placed on the cover 204, which in the closed position contacts the one or more pressure sensitive keys 206 for providing a weight measurement. The measurement of the weight 210 would need scaling. In FIG. 5*c*, a hand holding the device 200 applies a contact force on the main body 202 and the cover 204, which in the closed position contacts the one or more pressure sensitive keys 206 for providing a weight measurement.

The main body 202 has a circuit for responding to the force applied to the one or more pressure sensitive keys 206 for providing the weight measurement.

In summary, if the device 200 has pressure sensitive keys 206, similar to that discussed above, (e.g. navigation keys with linear scrolling speed adjusting, with some pressure sensitive keys), these pressure sensitive keys could be used as a scale. The keys could also sense (especially with cover) if the device is kept in hand (FIG. 5*c*) or if it is on some open area i.e. on the table. Depending on the information about hand pressure, the functionality of the HF (hands free) audio or ringing tones can be handled in a way similar to that discussed above in relation to the infrared sensor 28 in FIG. 2.

As discussed above, the audio level of the device 200 (i.e. cellular phone) with HF is optimized depending on the using mode.

In addition, some measurements of small weights are needed frequently (especially when comparing which one is heaviest). With this functionality the weight measuring option is easily on your hand if you are carrying the device (i.e. cellular phone).

The Internal Organization

The main system is made from the touch sensitive key (i.e. resistive key). Depending on the application, there could be some systems (i.e. cover) to conduct the force from some point/area to the key. Also an AD-converter is needed to convert the information from the pressure to digital format onto the processor.

For hand recognition, a rough estimation of the pressure is needed. For weight measuring, a calibration is needed. In the case of conducting the force from some point to another, some kind of information is needed about the effect of the conduction path of the force and good measurement information to users to make proper measurements.

The HF situation is usually solved with separate speakers for low volume and high volume sound in different places on the phone. Combining these two speakers into one has created the problem. But even in the separate speaker situations, the conductive noise from the covers are unpleasant.

In the case of using one speaker, the information about the hand is important. If the device is pressed when kept in the hand, there is a possibility of the device being very near the ear. In that case, some other method could be used to minimize the effect of an unexpected loud sound. Of course, the device could be located somewhere else under pressure, so it must be able to make a loud enough sound also in this case but the warning operations from incoming loud sound must be better than in the situations where the device is not kept in the hand (both operations need some warning effects).

The use of a resistive touch sensitive slide might be better because smaller current drain (when weight is on it for a short time only) and the capacitance could change the level of a zero-force under pressure for a long time.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

I claim:

1. An electronic device, comprising:
    a housing containing communications electronics, responsive to a movable housing element signal, for providing a communications signal to a communications system;
    a movable housing element being mounted movably on the housing, having a touch sensitive area that is responsive to a contact force applied by a user, and having touch sensitive circuitry for providing a force position signal indicative of the position of the contact force in relation to at least one dimension of the movable housing element;
    a sensor, for providing a movable housing element position signal indicative of the position of the movable housing element in relation to the housing; and
    means for providing the movable housing element signal based on the force position signal and the movable housing element position signal,
    the touch sensitive area including a keyboard with preprinted key signs, the function of the movable housing element changing based on the position thereof in relation to the main body, and when the moveable housing element is in a closed position in relation to the main body, the moveable housing element operating in a keyboard mode with the force position signal containing information about the preprinted key signs contacted by the user.

2. An electronic device according to claim 1, wherein the movable housing element is a touch sensitive slide.

3. An electronic device according to claim 1, wherein the movable housing element is a flip-type hinged structure.

4. A communications device, comprising:
    a main body having a main body communications circuit, responsive to a touch sensitive slide signal, for providing a communications signal to a communications system; and
    a touch sensitive slide being mounted movably on the main body for sliding along the main body, responsive to a contact force applied by a user on the touch sensitive slide, and having touch sensitive slide circuitry for providing the touch sensitive slide signal indicative of the position of the contact force in relation to at least one dimension of the touch sensitive slide,
    the touch sensitive slide having a keyboard with preprinted key signs, the function of the touch sensitive slide changing based on the position thereof in relation to the main body, and when the touch sensitive slide is in a closed position in relation to the main body, the touch sensitive slide operating in a keyboard mode with the touch sensitive slide signal containing information about the preprinted key signs contacted by the user.

5. A communications device according to claim 4, wherein the main body houses the main body communications circuit; and
    wherein the touch sensitive slide is slidably mounted on the main body.

6. A communications device according to claim 5, wherein the communications device has a display for providing communications information to the user; and
    wherein the touch sensitive slide covers a part of the display when slid in a closed position.

7. A communications device according to claim 6, wherein the touch sensitive slide is adapted as a mouse pad or a drawing table when the touch sensitive slide is slid in an open position; and
    wherein the touch sensitive slide signal contains information about mouse or drawing table inputs by the user.

8. A communications device according to claim 5, wherein the main body communications circuit includes a controller and a keyboard touchslide interface; and
    wherein the keyboard touchslide interface provides the touch sensitive slide signals to the controller.

9. A communications device according to claim 4,
wherein the main housing communications circuit includes a controller, a keyboard touchslide interface and an RF circuit;
wherein the keyboard touchslide interface provides the touch sensitive slide signal to the controller; and
wherein the controller processes the touch sensitive slide signal and provides the communications signal to the RF circuit; and
wherein the RF circuit provides the communications signal to the communications system.

10. A communications device according to claim 9,
wherein the touch sensitive slide includes slide circuitry and a slide interface circuit;
wherein the slide circuitry provides the touch sensitive slide signal to the touch sensitive slide interface; and
wherein the slide interface cooperates with the keyboard touchslide interface for providing the touch sensitive signal to the controller.

11. A communications device according to claim 4,
wherein the touch sensitive slide is made of touch sensitive resistive or capacitive material or electromechanical foil.

12. A communications device according to claim 4, wherein the preprinted key signs include either a send key, an end key, a pound key, an asterisk key or number keys from zero to nine or some combination thereof.

13. A communications device according to claim 12,
wherein the communications device includes a speaker for providing a keying guide sound containing audio information about the preprinted key signs which is activated by applying less pressure on the touch sensitive slide for assisting people having a sight handicap.

14. A communications device according to claim 12,
wherein the communications device includes a speaker;
wherein the main body communications circuit includes a controller and an audio circuit;
wherein the controller provides a keystroke confirmation signal to the audio circuit to confirm a key stroke; and
wherein the audio circuit, responds to the keystroke confirmation signal, for providing an audio confirmation signal to the speaker to provide a "click" sound when the preprinted key signs are pressed on the touch sensitive slide.

15. A communications device according to claim 12,
wherein the preprinted key signs are drawn on the surface of the keyboard.

16. A communications device according to claim 12,
wherein the preprinted key signs are drawn on and raised above the surface of the keyboard.

17. A communications device according to claim 12,
wherein the preprinted key signs are drawn on and hollowed below the surface of the keyboard.

18. A communications device according to claim 4,
wherein the touch sensitive slide is adaptable for using as a mouse or a drawing table; and
wherein the touch sensitive slide signal contains information about mouse or drawing table inputs by the user.

19. A communications device according to claim 4,
wherein the main body communications circuit includes an infrared (IR) sensor circuit for detecting the placement or location of the communications device in relation to an object, for providing an infrared (IR) sensor circuit signal containing information about the placement or location of the communications device in relation to the object.

20. A communications device according to claim 19,
wherein the communications device includes a speaker for providing a ring for an incoming call, and for providing voice signals to the user;
wherein the main body communications circuit includes a controller, responsive to the infrared (IR) sensor device signal, for providing a ring control signal; and
wherein the main body communications circuit also includes an audio circuit, responsive to the ring control signal, for adjusting the volume of the ring of the speaker in response to a ring control signal from the controller.

21. A communications device according to claim 4,
wherein the communications device is a mobile phone.

22. A communications device according to claim 4,
wherein the touch sensitive slide has one or two parameter sensing in the X or Y direction.

23. A communications device according to claim 4,
wherein the touch sensitive slide has a slide interface circuit for providing the touch sensitive slide signal provided to the main body communications circuit.

24. A communications device according to claim 4,
wherein the touch sensitive slide has slide circuitry having means for changing the color of the surface thereof depending on the contact force applied by the user.

25. A communications device according to claim 4,
wherein the touch sensitive slide has a keyboard construction that includes a back surface, an inner key construction and a touch sensitive top layer.

26. A communications device according to claim 25,
wherein there is a space formed in the inner key construction between the back surface and the touch sensitive top layer for pressing down the preprinted key signs.

27. A communications device according to claim 4,
wherein the communications device has a main body for housing the main body communications circuit; and
wherein the communications device has a slide position switch connected between the main body and the touch sensitive slide, that responds to the position of the touch sensitive slide in relation to the main body, for providing a slide position switch signal containing information about the position of the touch sensitive slide in relation to the main body.

28. An electronic device according to claim 4,
wherein the touch sensitive slide functions as a mouse or a drawing table when the touch sensitive slide is in an open position in relation to the main body; and
wherein the touch sensitive slide signal contains information about mouse or drawing table inputs by the user.

29. A touch sensitive slide according to claim 4, wherein the touch sensitive slide has a keyboard surface and is responsive to the contact force being applied on the keyboard surface.

* * * * *